April 5, 1966 L. S. SCHWARTZ 3,244,904
POWER PULSE GENERATOR INCLUDING CHOKE COIL WITH SATURABLE
CORE IN CHARGING CIRCUIT FOR RAPID RECHARGING
Filed Oct. 12, 1962 2 Sheets-Sheet 1

INVENTOR.
LAWRENCE S. SCHWARTZ

BY
*T. L. Styner*
ATTORNEY

United States Patent Office 3,244,904
Patented Apr. 5, 1966

3,244,904
POWER PULSE GENERATOR INCLUDING CHOKE COIL WITH SATURABLE CORE IN CHARGING CIRCUIT FOR RAPID RECHARGING
Lawrence S. Schwartz, Rochester, N.Y., assignor to General Dynamics Corporation, Rochester, N.Y., a corporation of Delaware
Filed Oct. 12, 1962, Ser. No. 230,181
5 Claims. (Cl. 307—88.5)

This invention relates to pulse forming circuits and is particularly directed to circuits for forming high powered pulses which may reoccur at high rates.

In radar or tacan systems, to pulse a magnetron, klystron, or other microwave generator, with power pulses of extreme amplitude and short duration, it is customary to slowly charge a storage condenser from a low power source and to then rapidly discharge the condenser through a switch to the generator. Generally, the maximum repetition rate of the power pulses is limited by the recovery time of the switch device connected in the modulating circuit. For most effective transmission of the RF pulses, the pulses should be smooth and free of spurious frequency components.

An object of this invention is to provide an improved generator of pulses of high power, of smooth shape and of high repetition rate.

When the storage condenser is fully charged, the entire charge of the condenser is suddenly released through the primary of a coupling transformer to the magnetron, a grid-controlled gas tube usually being employed as the switch mechanism for discharging the condenser. Unfortunately, gas tubes have a relatively long settling or recovery time before anode voltage can be reapplied, else the tube will prematurely ignite. An analoguous condition is found when the solid-state controlled rectifier is employed as the switch device.

It is, accordingly, a more specific object of this invention to provide an improved switch-controlled condenser circuit which can be more rapidly recharged.

The objects of this invention are attained by connecting a solid-state switch, such as the so-called silicon-controlled rectifier, in circuit between the storage condenser and the load circuit. Across the storage condenser is connected a direct current charging source including a choke coil with a saturable core and a rectifier for resonant charging the condenser to nearly twice the voltage of the direct current source. In the discharge circuit is included a second choke coil of sufficient inductance to cause, by resonant action, reverse charging of the storage condenser immediately after the power pulse and to swing the anode of the switch to a negative value. This provides a reverse current flow through the solid-state switch and enhances its recovery. Novel means retards the forward charging current and delays the application of positive voltage to the switch until after recovery.

Other objects and features of this invention will become apparent to those skilled in the art by referring to the specific example described in the following specification and shown in the accompanying drawings, in which.

Figure 1:
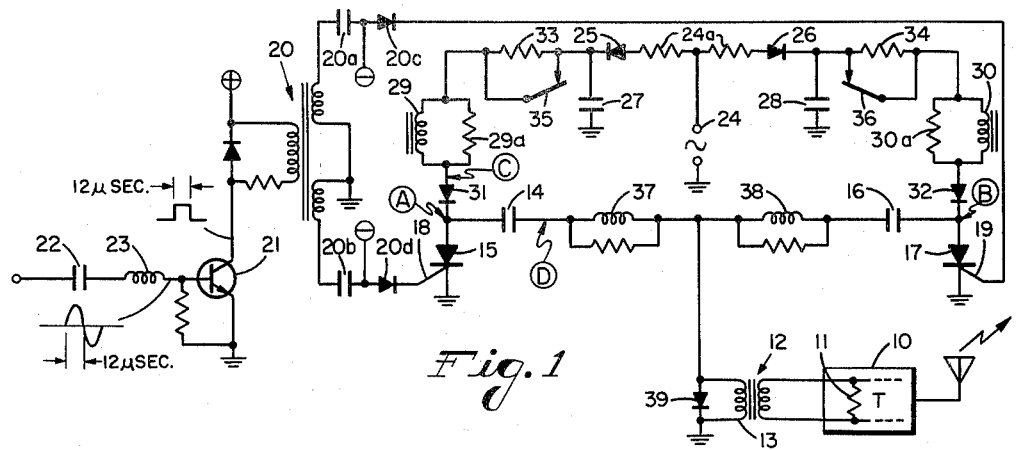
FIG. 1 is a schematic circuit diagram of the essential elements of a pulse generator of this invention.

At 10 in FIG. 1 is shown a radio transmitter for radiating short bursts or pulses of microwaves suitable for radar or tacan systems. The transmitter includes a magetron, kylstron, or other microwave generator which must be rapidly switched on and off by the power pulses generated in the circuits of FIG. 1. The load circuit presented by the transmitter is essentially resistive in nature, the load resistance being represented at 11. The power pulses are coupled to the transmitter through transformer 12, the primary winding 13 of which is connected directly to the power pulse circuits.

Figure 3:
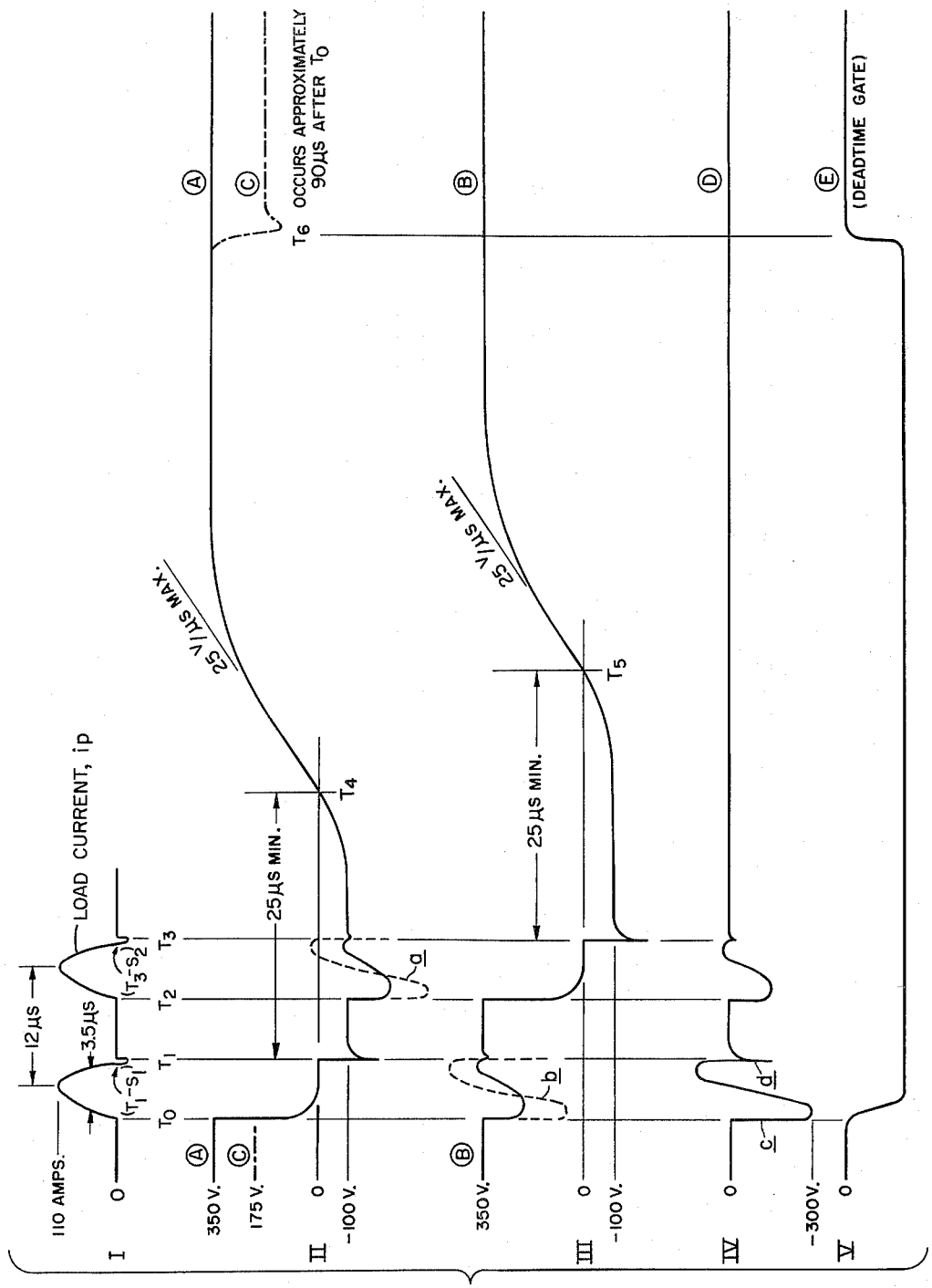
FIG. 3 shows a family of waveforms of the pulse circuits of FIGS. 1 and 4.

In tacan systems it is necessary generally to generate two power pulses with precise spacings, the spacings being twelve microseconds in presently standardized equipment. On line I, FIG. 3, is shown a pulse pair with twelve microsecond spacings and with the desired sinusoidal shapes. Each pulse must rise to a full 110 or more amperes in about two microseconds and then decay to zero in the following two to four microseconds with but a minimum transitory oscillation at the termination of the pulse. The pulse current remains at zero until the beginning of the second pulse so that there is no merging of the pulses to obscure either pulse in the receiving and decoding circuits at the receiver, not shown.

In FIG. 1, the high pulse current is obtained from the storage condenser 14 which is connected in series with the transformer load circuit through the switch device 15. Where two pulses are required, as in tacan where close spacing is required, the second storage condenser 16 is provided and is connected to the load circuit 12 through switch device 17. The switch devices 15 and 17 are solid-state devices preferably of the type commonly known as "silicon-controlled rectifiers," or SCR, which have four regions and are of the PNPN type, with a control electrode connected to the intermediate P-layer. The control electrodes are shown schematically at 18 and 19 in FIG. 1.

SOLID-STATE SWITCHES

Figure 2:
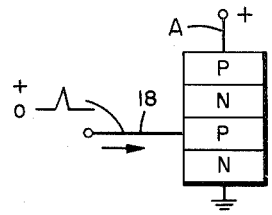
FIG. 2 shows a solid-state switch used in the circuits of FIG. 1.

Solid-state energy switches of the controlled rectifier type are in many respects similar to the grid-controlled gaseous discharge tube commercially known as the "Thyratron" in that forward current can be extinguished only by reducing the forward current to a value less than a minimum for sustaining the discharge. In solid-state switches, this extinguishing process is not instantaneous because during the forward conduction process a stored charge is accumulated in the two base regions and requires a finite time for removal. As shown in FIG. 2, the solid-state switch comprises alternate layers of P and N materials with the "anode" connection to the end P-layer and with the "cathode" connection to the N-layer. The control electrode for igniting the discharge is connected to the intermediate P-layer. Once the accumulated charges are removed, the junctions are fully recovered and are capable of blocking rated forward voltage. This process is similar to the deionization time of a gaseous discharge. Unfortunately, only the two end junctions are readily accessible to external circuits and the center junction is left to recover by the relatively slower process of recombination of the charge particles with an exponential time constant determined essentially by the bulk lifetime of the semiconductor material. According to an important discovery of this invention, a signicaint improvement in turn-off or recovery time of the solid-state rectifier is achieved by applying a reverse bias to the anode-cathode junctions, and controllably delaying the application of a positive voltage to the anode.

It has been found that application of a reverse bias to the solid-state anode results in a reverse current in the external circuit. If the forward load current in the external circuit comprises the pulses of current $i_p$, as shown on line I of FIG. 3, between time points $T_0$ and $T_1$ or $T_2$ and $T_3$, transitory reverse current will occur between time points $T_1$ and $S_1$ and $T_3$ and $S_2$. The energy content of these negative current loops represents the total charge in the end junctions which are removed by the reverse current. The anode-to-cathode terminal voltage remains approximately at the forward saturation level, which is usually less than one volt, as long as reverse current continues to flow. When the charge has been removed, the terminal voltage quickly assumes the value determined by the external bias source. This occurs at times $T_1$ and $T_3$ in the waveforms of FIG. 3. As will appear below, this external bias is negative and is derived from the discharge circuit.

Spaced control pulses of relatively low power and voltage applied to electrodes 18 and 19 are obtained from any source which will generate the pulses with the required time interval, which is twelve microseconds in the specific example here considered. The particular double pulse generator illustrated in FIG. 1 comprises the transformer 20 with a center-tapped secondary, opposite ends of which are coupled, respectively, to control electrodes 18 and 19. The coupling circuits include D.C. blocking condensers 20a and 20b and biased diodes 20c and 20d. The primary winding is connected in the output collector circuit of transistor 21, to the base of which is applied a damped sinusoidal waveform. The waveform at the base is obtained in the specific example shown by a ringing circuit including tuning condenser 22 and coil 23 which is so tuned as to resonate and provide a precise 12 microsecond half-wave. Transistor 21 is overdriven, between cut-off and saturation, to provide a square-wave in the collector circuit and to provide positive-going and negative-going differentiated voltage spikes, respectively, at the terminals of the secondary winding of the transformer 20. Because of phase-splitting action of the center-tapped transformer, control electrodes 18 and 19 of the power switches receive positive voltage spikes precisely 12 microseconds apart. The details of the control circuits are shown and described in detail in the copending application by Donald A. Dutton, Ser. No. 62,216, filed Oct. 13, 1960, entitled Generator of Random Double Pulse Pairs, and assigned to the assignee of this application now Patent No. 3,058,011, issued Oct. 9, 1962.

Briefly, each trigger voltage at the control electrodes 18 or 19 produce power pulses at the load 11. After each power pulse, the storage condenser 14, or condenser 16, is completely discharged and must be recharged. For this purpose, an alternating voltage source connected to terminal 24 supplies the necessary power for recharging the condensers. The alternating current is rectified in rectifiers 25 and 26, is smoothed by condensers 27 and 28, and is applied to condensers 14 and 16, respectively, through choke coils 29 and 30 in series with rectifiers 31 and 32. These coils are operative as saturable reactors. It will be noted that rectifiers 25 and 26 each functions as peak detectors and that condensers 27 and 28 charge to the peak voltages of the A.C. supply. For high altitude operation where voltages must be reduced, resistors 33 and 34 may be inserted in the charging circuit by opening switches 35 and 36. When storage condenser 14 is discharged, diode 31 is forwardly biased, and current commences to flow from the smoothing condenser 27 through the choke coil 29, and forwardly through rectifier 31. Charging current similarly flows through coil 30 and rectifier 32 to storage condenser 16. The values of the inductances of the coils 29 and 30 are so chosen with respect to the capacities of 14 and 16, respectively, that resonance occurs and the voltage applied to the storage condensers may swing to a value nearly twice the voltage of the smoothing condensers. Disconnect diodes 31 and 32 maintain the condensers at this high charging voltage. If the A.C. source at 24 is 100 to 124 volts, R.M.S., of commercial power frequencies, of say 300 to 1000 c.p.s., the smoothing condenser voltage will be about 175 volts and the storage condenser voltage will be near 350 volts.

CHARGING CIRCUIT

After a discharge pulse, it is imperative that the anode voltage of the controlled rectifier does not become positive before complete recovery of the center junction of the rectifier. To meet this requirement, the charging circuits of the double pulse generator have been designed to maintain an inverse anode voltage for a safe interval of time. This interval of time is indicated in FIG. 3 as $T_4-T_1$ on line II, and $T_5-T_3$ on line III. This is accomplished by first establishing a negative voltage on the anode and then by limiting the charging current into the pulse forming networks, including condenser 14 and inductance 37 and condenser 16 and inductance 38, to delay negative-to-positive reversal of anode voltage. Finally, the rate of rise of anode voltage is limited to prevent "rate-effects," referred to below. According to this invention, the saturable reactor choke coils 29 and 30 are, respectively, coupled in the charging circuits for the two pulse forming networks. The characteristics of the saturable reactors are ideally suited for the charging impedance of the networks. The reactors are more efficient than resistors and offer a more favorable ratio of permissible switch-recovery time to circuit-recovery time than either resistors or linear inductors. The relatively high incremental inductance of reactors 29 and 30 during unsaturated conditions is large enough to allow recovery of the controlled rectifiers, while the saturated inductance, although of lower value, is sufficient to limit the maximum rate of rise of forward anode voltage, $dv/dt$. It has been found that sudden application of anode voltage, or high $dv/dt$, will cause premature triggering of the rectifiers due apparently to rapid charging of the internal interjunction capacities. This phenomena is known in the art as the "rate-effect." Such saturable reactors must also exhibit low residual flux to assure positive reset at the end of each charging cycle. Cores of powdered molybdenum alloy are suitable for the cores of reactor choke coils 29 and 30. A further advantage of the inductive impedances of coils 29 and 30 resides in the fact that resonant charging of the pulse forming networks is easily accomplished which effectively doubles the voltage of the power supply. This in turn requires the use of the charging circuit disconnect diodes 31 and 32 between the inductive charging circuit and capacitance to be charged. It is true that the rated anode voltage of the controlled rectifiers must be doubled, when resonant charging is employed, but this increase of voltage has the advantage that, for a given energy stored, the capacitors 14 and 16 may be reduced in capacity by a ratio of 4:1 and the peak discharge current may be reduced by a ratio of $1/\sqrt{2}$.

ANTI-LOCK-UP POWER SUPPLY

Recovery of one charging circuit is indicated by the waveforms A and C of line II of FIG. 3. At time $T_6$ the charging current has decayed to zero and the disconnect diode 31 opens permitting dissipation of the energy stored in charging reactor 29 into damping resistor 29a and restoration of the relatively high incremental inductance of reactor 29. This results in the rapid drop in voltage at point C. If a trigger were applied to the discharge rectifier 15 before the charging reactor is recovered, between $T_4$ and $T_6$, the incremental inductance of coil 29 would be insufficient to permit recovery of rectifier 15. In such a case, the controlled rectifier 15 would turn back on and the initial current in the charging reactor would merely have to exceed the holding current to cause rectifier 15 to "lock-up." That is, rectifier 15 would remain conducting and the resulting current flow would be limited only by the power supply characteristics and circuit impedance.

In the lock-up condition the reactive impedance of reactor 29 is low and there results a destructive high current. Fuses or circuit breakers are much too slow acting in the circuit of this type to protect the rectifier from burnout. Furthermore, a blown fuse or a tripped circuit breaker would render the equipment useless until given corrective attention.

A simple solution to the problem, according to this invention, takes advantages of the normally undesirable characteristics of the rudimentary half-wave rectifiers 25 and 26. During its negative half-cycle, the A.C. power source connected to terminal 24 is disconnected from the filter or reservoir capacitors 27 and 28 by rectifiers 25 and 26. Thus, a condition of lock-up in either rectifier 15 or 17 would merely discharge condensers 27 or 28. When the current through a "locked-up" rectifier, 15 or 17, drops to less than its holding current, the turn-off process commences. At commercial power frequencies, there is a considerable time lapse between succeeding positive pulses at terminal 24 and ample time for the turn-off process. There is, of course, an upper limit on the size of the filter condensers 27 and 28 for a given power source frequency. This means that some measurable amount of amplitude ripple must be tolerated on the output pulses. Resistors 24a or a resistor 24a (FIG. 4), which is common to both charging circuits, limit the surge current to the rectifiers 25 and 26. In addition, these resistors provide an equalizing effect on the double pulse amplitude when the triggering pulses at 18 or 19 are random.

COHERENT DEAD TIME

Figure 4:
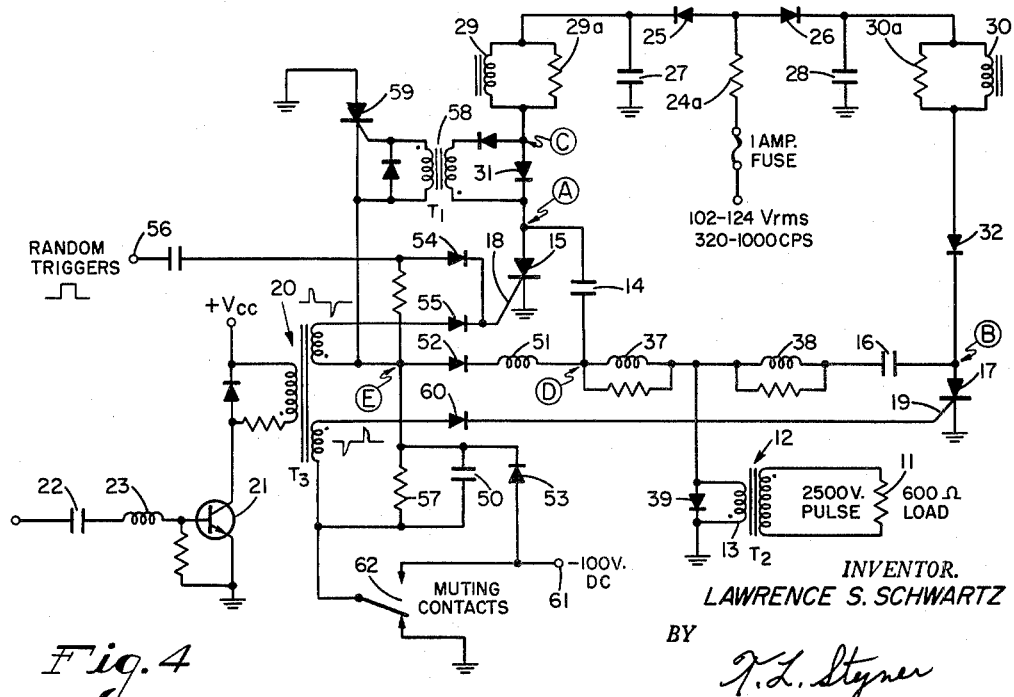
FIG. 4 shows an alternative embodiment of the pulse generator circuits of this invention, including dead-time banking circuits.

While the circuits of FIG. 1 have thus far been described in connection with uniformly spaced double pulses applied to control electrodes 18 and 19, it is desirable, in one application of this invention to tacan circuits, to apply random single pulses to control electrode 18. Since the random pulse may occur at any instant during the time intervals mentioned above and shown in FIG. 3, the trigger circuits must be blanked during a "dead" time from $T_0$ to $T_6$, as shown on line V of FIG. 3. The dead time circuits are shown in FIG. 4. Like-numbered elements in FIGS. 1 and 4 are similar.

In the operating mode where random pulses are superimposed upon the pulse pairs, rectifier 15 might receive the random pulses which could cause premature triggering unless means are provided to prevent triggering until complete circuit recovery. A dead time gate to blank the trigger circuit 18 will eliminate this problem. Since the ideal dead time would start with the first triggering at time $T_0$ and would terminate with the circuit recovery at time $T_6$, the circuit shown in FIG. 4 takes advantage of the switching transients which occur at circuit junctions D and C, respectively. The waveforms of junctions D and C are shown on lines IV and II, FIG. 3.

During the discharge cycle, a small portion of the charge stored in condenser 14 is transferred to condenser 50, FIG. 4, through coil 51 and rectifier 52. See the negative-going voltage $c$ on line IV. The voltage across condenser 50, limited by rectifier 53, is employed to enable and disable gate devices connected between the trigger pulse source and the control electrode 18. Rectifiers 54 and 55, in the system shown in FIG. 4, comprise the gates for protecting electrode 18. That is, a negative charge on condenser 50 reverse biases rectifiers 54 and 55 to prevent triggering of rectifier 15 by positive pulses from either the random pulse source 56 or the double pulse source at 20. With the exception of a small leakage through resistor 57, rectifier 52 maintains the charge on condenser 50 until charging circuit recovery at time $T_6$. The transient appearing across rectifier 31 at time $T_6$ is coupled through the isolating transformer 58 and triggers controlled rectifier 59. Rectifier 59 is preferably a low power solid-state controlled rectifier which turns on and rapidly discharges condenser 50. This removes the reverse bias from rectifiers 54 and 55 and enables triggering of rectifier 15 to take place from either triggering source, marking the end of blanking or dead time period. See the voltages for junction E in FIG. 3, line V.

The resistor 57 across the dead time storage capacitor 50 is necessary to remove the blanking bias should rectifier 59 fail to trigger because of an insufficient signal from point C. It is to be remembered that the firing of control rectifier 15 initiates the recharge cycle and the signal for rectifier 59. As long as condenser 50 remains charged, rectifier 15 is incapable of being triggered and no trigger is available to rectifier 59. Stray leakage could not protect against this situation as commutation of the discharge of condenser 16 is more than sufficient to replenish this charge. This is the smaller pulse $d$ at junction D, shown on line IV of FIG. 3. The fixed leakage path 57 allows complete discharge of condenser 50 between the synchronous double pulses to permit normal performance in the fundamental double pulse mode, without random pulses, in case of any failure in the dead time circuit.

Should it be desired to block all triggering pulses, a reverse bias applied to all three triggering diodes 54, 55 and 60 is provided by biasing source 61 through the upper contact of muting switch 62.

PULSE FORMING CYCLE AND CONTROL RECTIFIER TURN-OFF

The pulse forming networks consisting of 14, 37 and 16, 38 discharge through rectifiers 15 and 17, respectively, upon application of the trigger pulses. The currents combine in the primary winding 13 of the output transformer 12. These discharge currents build up in the form of a sinusoid damped by the load impedance 11 reflected into the primary from the load circuit and by the resistive losses of the switching circuit. The leakage inductance of transformer 12 is common to both circuits and forms a part of each pulse forming network. The generation of the double pulses could be achieved quite satisfactorily, using a single inductor directly in series with the primary winding 13 to replace the two inductances 37 and 38. This, however, would allow full coupling between the power pulse circuits of controlled rectifier 15 or 17 and would cause the voltage waveforms A and B, FIG. 3, to swing violently, as shown by the dotted line portions $a$ and $b$ of the curve, during the $T_1-T_0$ and the $T_3-T_2$ time intervals. The forward breakover ratings of the controlled rectifiers 15 and 17 in such a case must be increased to exceed the overshoot voltage, else there would result premature firing of the rectifiers.

In addition to the use of the two chokes 37 and 38 shown, a damping diode 39 may be connected across the transformer primary to minimize transient voltages. Diode 39 swamps the overshoot appearing in the common leakage inductance. In addition, diode 39 provides a low resistance shunt for the charging current of the two pulse forming networks.

The inductance of the two chokes 37 and 38 not only isolates the pulse circuits, but provides, by resonant action with associated capacities 14 and 16, the generation of the desired negative anode hold-off voltages for the turn-off intervals $T_4-T_1$ and $T_5-T_3$.

As explained, fast reliable turn-off is enhanced by providing a reverse bias and reverse current flow for shortening the settling time of the controlled rectifiers 15 and 17. In designing a specific circuit, a margin of safety may be assured by providing under-damping for the discharge circuit. If the resistance 11 of the load is fixed, the ratio of turns of the primary and secondary windings of the transformer is fixed for a given amount of resistive load reflected into the primary circuit. Energy storage capacitors 14 and 16 discharge in one direction and recharge in the opposite direction during the formation of the output pulses. A portion of the energy in this reverse charge is expended in the turn-off process discussed above, while the remainder of this energy is returned to the source, or is retained in storage until generation of the next pulse. Thus, there is generally an abundance of energy always available for the turn-off mechanism to tolerate normal variations in load impedance.

The solid-state pulse generator of this invention produces pulses of high power and of smooth shape at a high repetition rate. The solid-state controlled rectifiers are settled rapidly by employing reverse current through the rectifiers. The reverse current accelerates the dissipation of the charges in the end layers of the rectifiers and permits the recombination of the charges in the intermediate layers before the anode is permitted to go positive. Further, the rate of recharging is effectively limited to prevent preignition by the sudden application of voltages to the anodes of the rectifiers. Many modifications may be made in the specific circuit components without departing from the scope of the invention as defined in the appended claims.

What is claimed is:

1. A power pulse generator comprising a storage condenser, a charging circuit and a discharging circuit coupled across said condenser, said discharge circuit comprising an inductive load, a solid-state switch device connected between said load and said condenser, said device having an anode and a cathode, one of which is connected to said load and the other of which is connected to said condenser, said switch device having a predetermined settling time, the inductive reactance of said load being sufficient, in combination with the capacitive reactance of said storage condenser, to carry by resonant action the anode of said switch device to a voltage which is negative with respect to said switch device cathode, said charging circuit comprising a voltage source and a choke coil with a saturable core, the unsaturated inductance of said choke coil being sufficient to retard the condenser charging current and extend the duration of said negative voltage beyond said predetermined settling time, the saturated inductance of said coil being sufficient to provide for rapid recharging of said condenser.

2. A power pulse generator for use with a load circuit having inductive and resistive impedance, said generator comprising a storage condenser, a transformer with a primary winding and a secondary winding coupling said load to said condenser, a first choke coil, a switch device, said switch device having a control electrode and a current path established by said control electrode, said first choke coil, said current path, said condenser and said primary winding being connected in series with each other, the inductance of said first choke coil and the capacity of said condenser being resonant to reverse bias said switch device when shock-excited by pulse current; a condenser charging circuit including a direct current source, a diode connected in said charging circuit betwen said switch device and said direct current source, and a second choke coil having a saturable core of material exhibiting low residual magnetism in said charging circuit to retard the rate of charging of said condenser by said direct current source, the saturated inductance of said coil being sufficient to provide for rapid recharging of said condenser.

3. A power pulse generator for generating a power pulse at a load, said generator comprising a storage condenser, a discharge circuit across said condenser including inductive reactance, a silicon controlled rectifier with a control electrode, an anode electrode and a cathode, a source of trigger pulses, the anode-cathode current path of said rectifier being connected in said discharge circuit and polarized to discharge said condenser into said load in response to a trigger pulse from said source on said control electrode, a charge circuit including a direct current source with limiting impedance connected to said condenser, the time constant of said charging circuit being sufficient to delay forward bias of said rectifier for a period of time sufficient for said rectifier to settle to a stable off-condition, a gate circuit connected between said trigger pulse source and said control electrode, means response to current in said discharge circuit for inhibiting said gate, and means responsive to voltages in said charging circuit to enable said gate.

4. In the power pulse generator defined in claim 3, said gate comprising a disconnect diode, a biasing condenser connected across said diode, a circuit connected between said discharge circuit and said biasing condenser for charging said biasing condenser, and a controlled switch connected across said biasing condenser for removing the biasing charge on said biasing condenser.

5. A power pulse generator for generating power pulses at a load, having inductance and resistance, said generator comprising a pair of storage condensers both connected to said load, a pair of controlled solid state rectifiers connected separately to different ones of said condensers, a single alternating current source, a pair of peak detectors connected separately between said source and different ones of said condensers, each peak detector including a smoothing condenser for limiting the total energy to said storage condensers, and a pair of choke coils with saturable cores connected separately in series with different ones of said peak detectors, the saturated inductance of said choke coils providing for rapid recharging of said storage condensers.

References Cited by the Examiner

UNITED STATES PATENTS

| | | | |
|---|---|---|---|
| 2,693,532 | 11/1954 | Krienen | 328—67 |
| 2,764,684 | 9/1956 | Mayer | 328—67 X |
| 3,058,011 | 10/1962 | Dutton | 307—88.5 |
| 3,134,048 | 5/1964 | Wolfframm et al. | 328—67 X |

OTHER REFERENCES

Publication: "Applications and Circuit Design Notes," by Solid State Products, Inc., Bulletin D420–02–12–59 (December 1959). Pages 12–13 are pertinent.

ARTHUR GAUSS, *Primary Examiner.*

S. D. MILLER, *Assistant Examiner.*